Patented May 24, 1949

2,470,949

UNITED STATES PATENT OFFICE 2,470,949

DI(ORTHOACYLAMINOARYL) DISULFIDE SOFTENERS FOR ISOOLEFIN-DIOLEFIN COPOLYMERS

Philip T. Paul, Naugatuck, Conn., assignor to United States Rubber Company, New York, N. Y., a corporation of New Jersey No Drawing. Application February 8, 1947, Serial No. 727,301

16 Claims. (Cl. 260—30.8)

1

The present invention relates to softeners for isoolefin-diolefin copolymers, or so-called butyl rubber.

The polymerization of a mixture of a major proportion of isoolefin and a minor proportion of conjugated diene in the presence of a Friedel-Crafts polymerization catalyst of the type of aluminum chloride or boron trifluoride to produce synthetic rubbers of the so-called butyl rubber type, is known. Examples of such isoolefins are isobutylene (dimethyl ethylene), 2-methyl butene-1 (ethyl methyl ethylene), 2-ethyl butene-1 (diethyl ethylene), and examples of such conjugated dienes are butadiene-1,3, isoprene (methyl-2-butadiene-1,3), chloroprene (chloro-2-butadiene-1,3), 2,3-dimethyl butadiene-1,3, cyclopentadiene, piperylene (pentadiene-1,3). Details of the preparation of such isoolefin-diolefin copolymers may be found in U. S. Patents Nos. 2,356,128; 2,356,129; 2,356,130 and 2,332,194.

I have discovered that di(orthoacylaminoaryl) disulfides are excellent softeners for copolymers of a major proportion of isoolefin and a minor proportion of conjugated diene. The di(orthoacylaminoryl) disulfides which are the new softeners for such isoolefin-diolefin copolymers according to the present invention may be designated by the general formula

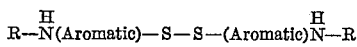

where R is an acyl radical, that is, a radical derived from an organic acid by removal of the hydroxyl group, and the nitrogens are in ortho positions to the sulfur atoms. Examples of the acyl radical "R" are formyl, acetyl, propionyl, butyryl, valeryl, caproyl, capryl, pelargonyl, myristyl, palmitoyl, stearoyl, margaryl, crotonyl benzoyl, naphthoyl, p-phenyl benzoyl, mono-chloracetyl, dichloracetyl, benzene sulfonyl, p-tolyl sulfonyl, thioacetyl, thorpropionyl. The aromatic nucleus of the general formula may be an arylene nucleus of the benzene, naphthalene, or biphenyl series which may be unsubstituted save for the sulfur and amino group or which may be otherwise substituted as by such groups as alkyl, aryl, hydroxyl, halogen, aryloxy, alkoxy, tertiary amino. The preferred di(orthoaminoaryl) disulfides are the di(2-acylaminophenyl) disulfides of which 2,2'-dithio bis acetanilide, otherwise known as 2,2'-diacetamino diphenyl disulfide, having the formula

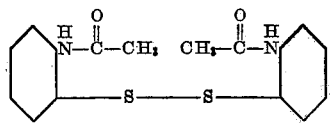

is the present preferred embodiment. Other examples of di(orthoaminoaryl) disulfides are 2,2'-dithio bis (4-methyl acetanilide), 2,2'-dithio bis

2

(4-methoxy acetanilide), 2,2'-dithio bis (4-phenoxy acetanilide), 2,2'-dithio bis (4-chloro acetanilide), 2,2'-dithio bis (4-dimethylamino acetanilide), 2,2'-dithio bis (1-acetyl amino naphthalene), 1,1'-dithio bis (2-acetyl amino naphthalene).

Di(orthoaminoaryl) disulfides are known per se and may be prepared in known manner by acylating the di (orthoaminoaryl) disulfides. For example, 2,2'-bis thioaniline may be prepared from aniline and sulfur according to the procedure of Hofman in Berichte der Deutschen Chemischen Gesellschaft, vol. 27, p. 2807 (1894). The 2,2' bis thioaniline may be acylated with glacial acetic acid and acetic anhydride according to the method of Clark, Journal of the Chemical Society (London), of 1926, page 2313, to give 2,2'-dithio bis acetanilide or 2,2'-diacetamido diphenyl disulfide. Clark similarly discloses the preparation of 2,2'-dithio bis propionanilide from 2,2'-bis thioaniline and propionic acid, and also 2,2'-dithio bis benzanilide from 2,2'-bis thioaniline and benzoyl chloride. 2,2'-dithio bis formanilide may be prepared from 2,2'-bis thioaniline and formic acid by the method of Tomlinson, Journal of the Chemical Society (London) of 1936, p. 1607. The amount of di(orthoacylaminoaryl) disulfide is not critical, generally amounts from about 0.25 part to 5 parts or more per 100 parts of the isoolefin-diolefin copolymer being used depending on the degree of softening desired. The di(orthoacylaminoaryl) disulfide, as is customary with plasticizers, is preferably mixed into the isoolefin-diolefin copolymer composition before the usual vulcanizing or compounding ingredients are added. The isoolefin-diolefin copolymer may be softened by mixing with a small amount of di-(orthoacylaminoaryl) disulfide in a mixer, or on a mill at conventional milling temperature.

The following examples are illustrative of the invention:

Example I

Samples of a commercial butyl rubber stock (copolymer of about 96 to 99 parts by weight of isobutylene and 4 to 1 parts by weight of isoprene), were milled in a Banbury mixer alone (control) and with the addition of various di-(orthoacylaminoaryl) disulfides for ten minutes at a temperature of 300–350° F. After milling, the stocks were allowed to stand twelve to fourteen hours at room temperature. After such rest, the samples were tested in a Mooney shearing disc plastometer. This instrument has been described by M. Mooney in Industrial and Engineering Chemistry (Anal. Ed.) 6, 147 (1934). By means of this device, the viscosity of a plastic material in shear may be readily and quantitatively measured. The readings recorded in the data in the following examples are viscosity readings after four minutes between platens of the instrument at 212° F., a one minute warm up period being used. The readings are based on an arbitrary standard, the lower the readings, the lower the viscosity and hence the greater the plasticity. The average Mooney viscosity measurements on the control samples (i. e. the samples in which no di(orthoacylaminoaryl) disulfide had been added) was 79. The incorporation of 0.5 part of 2,2'-dithio bis acetanilide per 100 parts of butyl rubber gave a Mooney viscosity of 22. Similarly the incorporation of 0.5 part of 2,2'-dithio bis propionanilide and 1 part of 2,2'-dithio bis stearanilide per 100 parts of the butyl rubber gave Mooney viscosities of 26 and 30, respectively.

*Example II*

Samples of another commercial butyl rubber stock (copolymer of 96 to 99 parts by weight of isobutylene and 4 to 1 parts by weight of isoprene), were milled in a Banbury mixer alone (control) and with the addition of 0.25 part of 2,2'-dithio bis acetanilide per 100 parts of the butyl rubber for ten minutes at a temperature of about 350° F. After milling, the stocks were allowed to stand twelve to fourteen hours at room temperature. After such rest, the samples were tested in a Mooney shearing disc plastometer, as in Example I. The average Mooney viscosity measurements on the control samples (i. e. the samples in which no 2,2'-dithio bis acetanilide had been added) was 84. The incorporation of 0.25 part of 2,2'-dithio bis acetanilide per 100 parts of the butyl rubber gave a Mooney viscosity of 62.

This is a continuation-in-part of application Serial No. 559,233, filed October 18, 1944, now abandoned.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A composition of matter comprising a rubbery copolymer of a major proportion of an isoolefin having not more than 6 carbon atoms and a minor proportion of a conjugated diene having not more than 6 carbon atoms and, as a softener therefor, a di(orthoacylaminoaryl) disulfide, the said di(orthoacylaminoaryl) disulfide being present in a quantity not more than 5 parts per 100 parts of said copolymer.

2. A composition of matter comprising a rubbery copolymer of a major proportion of an isoolefin having not more than 6 carbon atoms and a minor proportion of a conjugated diene having not more than 6 carbon atoms with which is admixed 0.25 to 5 parts of a di(orthoacylaminoaryl) disulfide per 100 parts of said copolymer.

3. A composition of matter comprising a rubbery copolymer of a major proportion of isobutylene and a minor proportion of a conjugated diene having not more than 6 carbon atoms and, as a softener therefor, a di(orthoacylaminophenyl) disulfide, the said di(orthoacylaminophenyl) disulfide being present in a quantity not more than 5 parts per 100 parts of said copolymer.

4. A composition of matter comprising a rubbery copolymer of a major proportion of isobutylene and a minor proportion of a conjugated diene having not more than 6 carbon atoms with which is admixed 0.25 to 5 parts of a di(orthoacylaminophenyl) disulfide per 100 parts of said copolymer.

5. A composition of matter comprising a rubbery copolymer of a major proportion of isobutylene and a minor proportion of isoprene and, as a softener therefor, a di(orthoacylaminophenyl) disulfide, the said di(orthoacylaminophenyl) disulfide being present in a quantity not more than 5 parts per 100 parts of said copolymer.

6. A composition of matter comprising a rubbery copolymer of a major proportion of isobutylene and a minor proportion of isoprene with which is admixed 0.25 to 5 parts of a di(orthoacylaminophenyl) disulfide per 100 parts of said copolymer.

7. A composition of matter comprising a rubbery copolymer of a major proportion of isobutylene and a minor proportion of isoprene and, as a softener therefor, 2,2'-dithio bis acetanilide, the said 2,2'-dithio bis acetanilide being present in a quantity not more than 5 parts per 100 parts of said copolymer.

8. A composition of matter comprising a rubbery copolymer of a major proportion of isobutylene and a minor proportion of isoprene with which is admixed 0.25 to 5 parts of 2,2'-dithio bis acetanilide per 100 parts of said copolymer.

9. The method of plasticizing a rubbery copolymer of a major proportion of an isoolefin having not more than 6 carbon atoms and a minor proportion of a conjugated diene having not more than 6 carbon atoms which comprises incorporating therein a di(orthoacylaminoaryl) disulfide, the said di(orthoacylaminoaryl) disulfide being in a quantity not more than 5 parts per 100 parts of said copolymer.

10. The method of plasticizing a rubbery copolymer of a major proportion of an isoolefin having not more than 6 carbon atoms and a minor proportion of a conjugated diene having not more than 6 carbon atoms which comprises incorporating therein 0.25 to 5 parts of a di(orthoacylaminoaryl) disulfide per 100 parts of said copolymer.

11. The method of plasticizing a rubbery copolymer of a major proportion of isobutylene and a minor proportion of a conjugated diene having not more than 6 carbon atoms which comprises incorporating therein a di(orthoacylaminophenyl) disulfide, the said di(orthoacylaminophenyl) disulfide being in a quantity not more than 5 parts per 100 parts of said copolymer.

12. The method of plasticizing a rubbery copolymer of a major proportion of isobutylene and a minor proportion of a conjugated diene having not more than 6 carbon atoms which comprises incorporating therein 0.25 to 5 parts of a di(orthoacylaminophenyl) disulfide per 100 parts of said copolymer.

13. The method of plasticizing a rubbery copolymer of a major proportion of isobutylene and a minor proportion of isoprene which comprises incorporating therein a di(orthoacylaminophenyl) disulfide, the said di(orthoacylaminophenyl) disulfide being in a quantity not more than 5 parts per 100 parts of said copolymer.

14. The method of plasticizing a rubbery copolymer of a major proportion of isobutylene and a minor proportion of isoprene which comprises incorporating therein 0.25 to 5 parts of a di(orthoacylaminophenyl) disulfide per 100 parts of said copolymer.

15. The method of plasticizing a rubbery copolymer of a major proportion of isobutylene and a minor proportion of isoprene which comprises incorporating therein 2,2'-dithio bis acetanilide, the said 2,2'-dithio bis acetanilide being in a quantity not more than 5 parts per 100 parts of said copolymer.

16. The method of plasticizing a rubbery copolymer of a major proportion of isobutylene and a minor proportion of isoprene which comprises incorporating therein 0.25 to 5 parts of 2,2'-dithio bis acetanilide per 100 parts of said copolymer.

PHILIP T. PAUL.

No references cited.